United States Patent Office

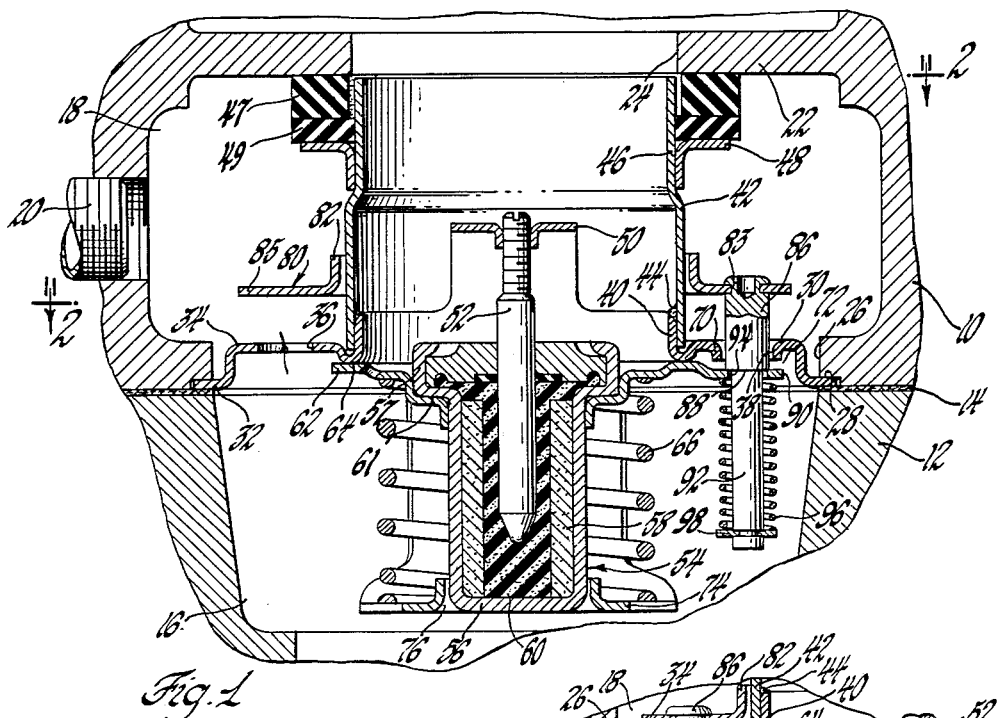

3,092,322
Patented June 4, 1963

3,092,322
BY-PASS VALVE THERMOSTAT
Adolf Schwarz, Lockport, N.Y., assignor to General Motors Corporation, Detroit, Mich., a corporation of Delaware
Filed Aug. 7, 1961, Ser. No. 129,799
3 Claims. (Cl. 236—34.5)

This invention relates to valves and more particularly to combinations of valves in units each of which includes a main valve adapted to be thermostatically operated and a bypass valve adapted automatically to open when the main valve is closed and automatically to close when the main valve is open.

Thermostats in common use for controlling the temperature of internal combustion engine coolants are often of the type disclosed in the United States Patent 2,881,616, granted April 14, 1959, in the names of H. J. Clifford and A. Schwarz. Such thermostats employ a pellet motor which includes a thermally expansive wax. Heating and consequent expansion of the wax causes a valve to open and permit engine coolant to circulate through a frame of the valve and a radiator. A spring is relied upon to close the valve when the temperature of the coolant falls below a predetermined range of engine operating temperature. When the engine is cold it is advantageous to provide a secondary or bypass valve whereby engine coolant may be circulated through the engine cooling jacket without flowing through the radiator. Such a provision is disclosed in the United States Patent 2,899,026, granted August 11, 1959, in the names of P. E. Hitch and J. W. Walsh. That patent shows the use of a bellows motor instead of a pellet-type motor but either type of expansible motor may be used in practicing the present invention the purpose of which is to avoid strain and damage to the thermostat unit when the motor is subjected to excessive heat.

An object, therefore, of the present invention is to provide an improved main and bypass valve combination thermostat having no positive stop within a possible range of action to cause damage due to exposure of the thermostat to excessive heat.

A feature of the present invention is to two-valve thermostat unit capable of diverting a flow of fluid to either or both of two separate discharge paths by use of a thermally expansible motor the effective action of which is determined by yielding stop means.

These and other important features of the invention will now be described in detail in the specification and then pointed out more particularly in the appended claims.

In the drawings:
FIGURE 1 is a sectional view through a thermostat unit disclosing one embodiment of the present invention the view being taken looking in the direction of the arrows 1—1 in FIGURE 2, and a main valve of the unit being closed with a bypass valve open in diverting the flow of engine coolant from its normal path to a radiator;

FIGURE 2 is a sectional view looking in the direction of the arrows 2—2 in FIGURE 1, a secondary valve element being omitted better to illustrated the construction;

FIGURE 3 is a sectional view of a portion of the thermostat shown in FIGURE 1 with a main valve open for normal operation and a bypass valve being closed; and FIGURE 4 is a perspective view of a secondary valve element or an annular bypass valve element utilized in the thermostat of FIGURE 1.

In FIGURES 1 and 3 of the drawings two castings 10 and 12 are shown as clamped together with a sealing gasket 14 interposed. These castings represent portions of an engine coolant system and involve two chambers 16 and 18. The chamber 16 may be termed an inlet chamber for receiving engine coolant from the engine jacket. The chamber 18 is herein termed a bypass chamber for it is adapted to receive heated engine coolant and return it by way of a conduit 20 to the engine block until the engine attains its normal operating temperature. The casting 10 has a wall 22 defining an outlet 24 leading to the car radiator. The lower portion of the casting 10 is apertured as at 26 for registering with the chamber 16 and around this aperture 26 is an annular recess 28 for retaining the peripheral margin of a thermostat frame 30 transverse to the chamber 16. The periphery of the frame 30, which is of sheet metal, constitutes a circular flange 32 and inside the periphery is an annular and radially flat portion 34 which defines four arcuate bypass or secondary openings 36 as well as four circular openings 38 placed 90° apart. The frame 30 also has a main central opening 40 and includes a central conduit 42 in a joinder by solder at 44. An upper reduced portion 46 of the conduit 42 is exteriorly fitted with an angle member 48 fixed in position so as to hold, after installation in a system, the sealing washers 47 and 49 in position against the wall 22 and around the opening 24. The effective portion 34 of the flange 32 lies in a given plane and a main valve element and a bypass valve element lie on opposite sides of this plane as will be evident as the description proceeds.

The frame 30 has a bridge portion 50 which supports a fixed pin 52 which depends downwardly from the bridge portion and forms the fixed portion of a pellet-type thermostatic motor generally indicated at 54. This motor, in all pertinent respects, operates as does the motor in the Patent No. 2,899,026, previously referred to. It includes a movable portion or casing 56 containing an expansible wax 58 and a rubbery center core 60. The casing with its contents is axially slidable upon the larger portion of the pin 52.

An upper part of the motor casing 56 is enlarged as at 57 to form a shoulder 61 engaging the main valve member 62. The latter, when closed, is held against an annular seat 64 formed on the frame to control the central opening 40. The holding is performed by a coil spring 66 urging the valve member 62 against the shoulder 60 as well as the seat 64. The four circular openings 38 in the frame are defined by downwardly directed flanges as seen at 70 in FIGURES 1 and 3. When the main valve 62 is in its closed position as seen in FIGURE 1, a clearance 72 exists between the flanges 70 and the valve element 62.

A depending bridge member 74 is also fixed to the frame 30 to form a part thereof and is apertured as at 76 for the guidance of the axially movable casing 56. This bridge also serves to support the lower end of the spring 66 in the latter's holding of the main valve element 62 in position.

Above and parallel with the radial flat portion 34 of the frame is an annular secondary valve element 80. FIGURE 4 shows the element 80 as having an annular upstanding flange 82 and two diametrically opposed openings 83 located in a horizontal flange 85. Into each of these openings 83 is fixed the upper end of a downwardly depending pin 86. Each pin extends downwardly through a circular opening 38 of the frame and is constructed with a downwardly facing shoulder 88 adapted when the main valve element 62 is in its closed position to engage the upper surface of one of two ears 90 extending radially from the main valve element 62. A reduced portion 92 of each pin 86 extends downwardly through an opening 94 in an ear 90 and at its lower end carries a washer 94. A coiled spring 96 is supported around each pin and between the corresponding washer 98 and the lower surface of an ear 90.

When the main valve member 62 is in its closed position, the large diameter portion of each pin 86 supports the secondary valve element 80 in its raised or open position as shown in FIGURE 1.

The operation of the thermostat is apparent from the above description but it may be stated that when the expansible motor 54 is cool the main valve 62 will be closed against the seat 64 and the secondary valve element 80 will be in its uppermost position permitting circulation of bypass fluid from the inlet chamber 16 and the openings 34 and 38 in the frame 30 to the chamber 18. From this chamber fluid may return to the engine cooling jacket by way of the conduit 20. When the engine approaches its normal operating temperature, however, the motor 54 will be actuated and expansion of the wax 58 will cause movement of the casing 56 in a downward direction with respect to the fixed pin 52. FIGURE 3 illustrates the new position of the movable part or casing of the motor with the resultant compression of the spring 66, the opening of the main valve 62 leading to the central passage 40 and a closing of the secondary or by-pass valve arrangement due to the lowering of the secondary valve element 80 into contact with the surface 34.

In the event that the engine is subjected to overheating, the secondary valve element 80 will seat on the frame 30 simultaneous with the full opening of the main valve 62. Any further downward movement of the motor casing 56 because of the overheating will result in a further compression of the two springs 96 and no harm will be done to the thermostat.

What is claimed is:
1. A by-pass valve thermostat comprising a frame having a peripheral supporting flange lying in a given plane, the said frame having a central conduit presenting a discharge outlet and a side by-pass opening in said flange determining paths of flow, a first valve element at one side of said plane and controlling said discharge outlet, a second valve element surrounding said conduit at the other side of said plane and controlling said by-pass opening, means yieldingly connecting said valve elements for joint movement of the latter, a motor having two relatively movable parts, one of said motor parts being fixed to said frame, the other of said motor parts being connected to one of said valve elements, and spring means retained by said frame and arranged to oppose relative movement of the motor parts when said first valve element is moved away from said discharge outlet by said motor due to subjection of the latter to an elevated temperature.

2. A by-pass valve thermostat comprising a sheet metal frame with an encircling supporting flange and adapted to be installed transverse to the junction of an inlet and two outlet passages in a liquid conduit system, said frame having a conduit forming a central main outlet leading through said flange and adapted to communicate with one of said outlet passages and a secondary opening extending in the same general direction as said central main outlet and adapted to communicate with the other of said outlet passages, a main valve element controlling said central main outlet, a thermally operable motor supported on said frame and having a movable part arranged to move said main valve element from said conduit when subjected to elevated temperature, spring means acting between said frame and said main valve element and urging the latter to its closed position, a secondary valve element surrounding said conduit and positioned to control said secondary opening, and means yieldingly connecting said main and secondary valve elements for joint movement.

3. A by-pass valve thermostat comprising a frame having a main discharge conduit, a supporting annular flange in a given plane and extending outwardly from said conduit, and an open bridge member joined into an integral structure, said thermostat including a first valve element controlling said main conduit and located with said open bridge member on one side of said plane, a by-pass opening in said flange, a second valve element surrounding said conduit and located at the other side of said plane to control said by-pass opening, means yieldingly connecting said valve elements for joint movement of the latter in the same general direction, a motor having two relatively movable parts, one of said motor parts being fixed to said frame, the other of said motor parts being connected to said first valve element, and spring means retained by said open bridge member and arranged to oppose relative movement of the motor parts when said first valve element is moved away from said main discharge conduit by said motor due to subjection of the latter to an elevated temperature.

References Cited in the file of this patent
UNITED STATES PATENTS

| | | |
|---|---|---|
| 2,359,448 | Shaw | Oct. 3, 1944 |
| 2,489,209 | Watkins | Nov. 22, 1949 |

FOREIGN PATENTS

| | | |
|---|---|---|
| 1,035,408 | Germany | July 31, 1958 |
| 1,221,472 | France | Jan. 11, 1960 |